Feb. 18, 1941.   S. MINORIKAWA   2,232,339
ROTARY PAN FOR MULTISPOOL REELING
Filed Dec. 29, 1938   3 Sheets-Sheet 1
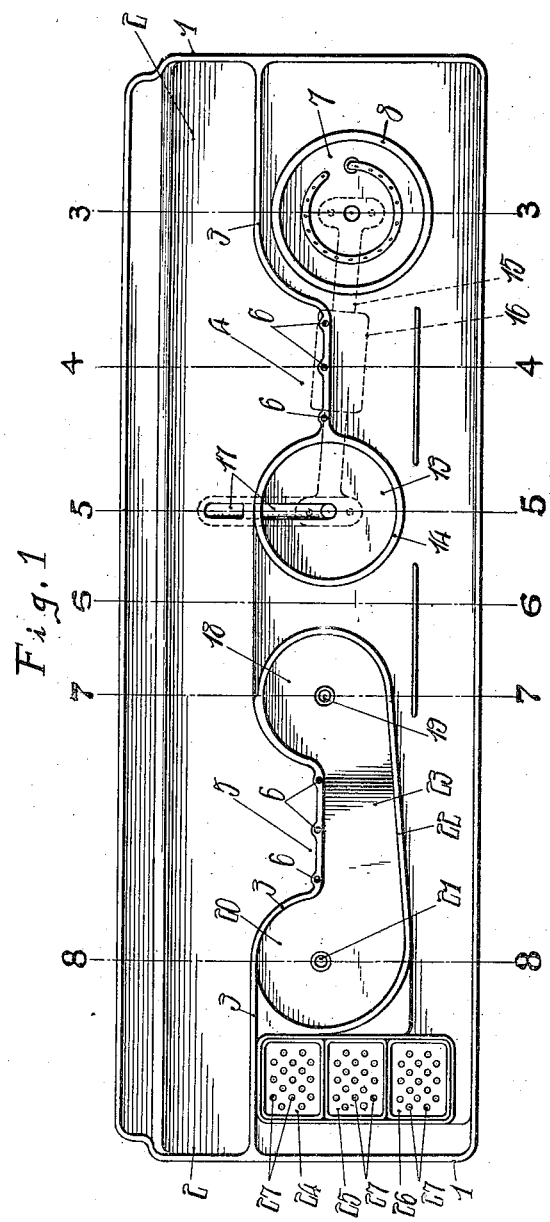
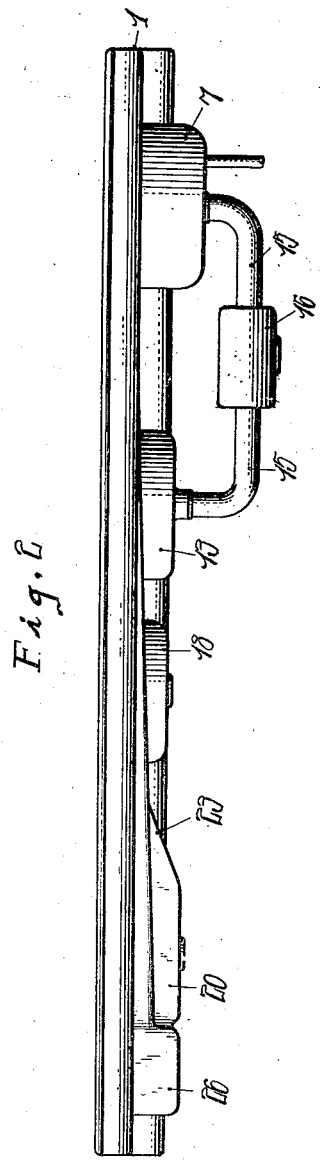
S. Minorikawa
Inventor
By: Glascock Downing & Seebold
Attys.

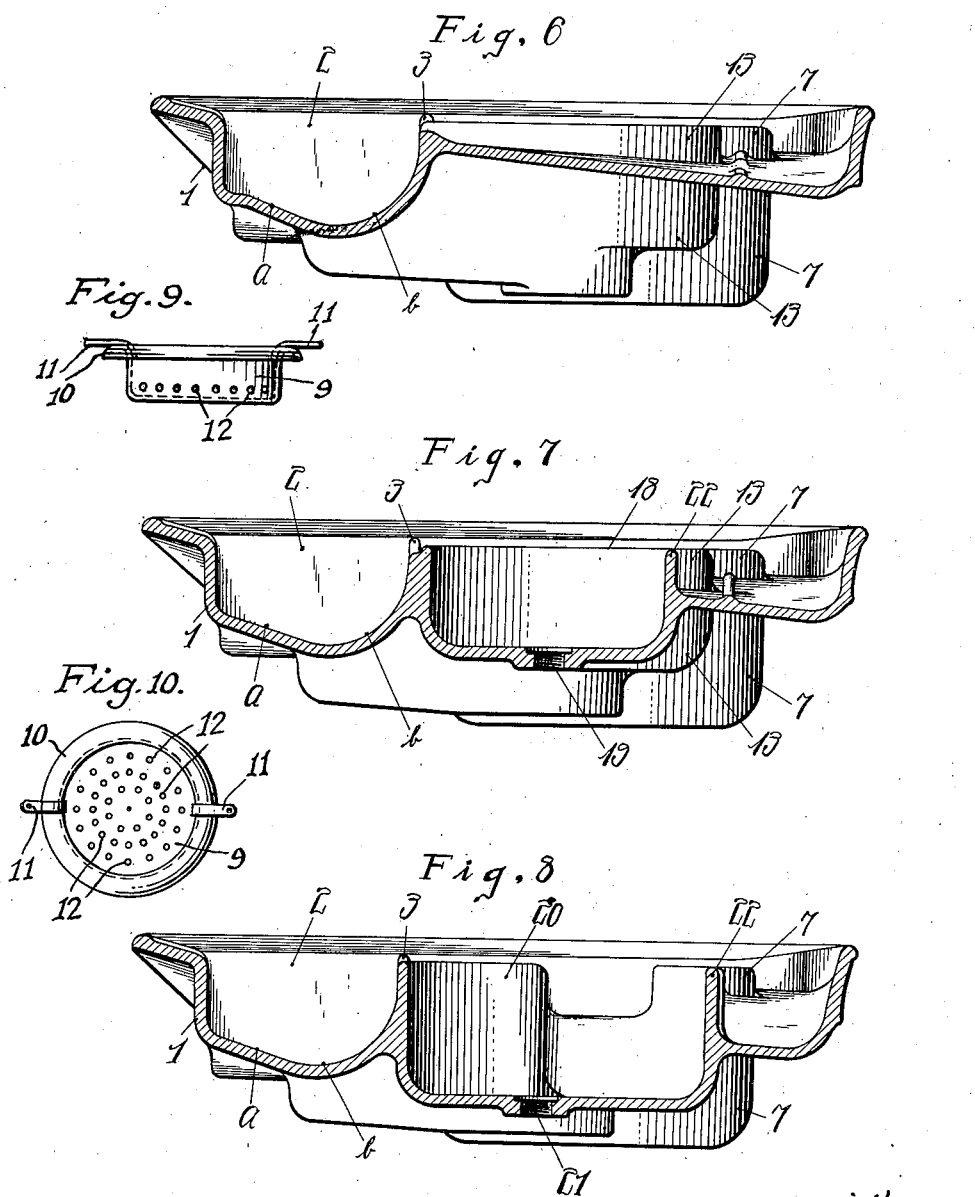

Patented Feb. 18, 1941

2,232,339

UNITED STATES PATENT OFFICE 2,232,339

ROTARY PAN FOR MULTISPOOL REELING

Saburo Minorikawa, Koishikawaku, Tokyo, Japan, assignor of one-half to Katakura Seishi Boseki Kabushiki Kaisha, Kyobashi, Kyobashiku, Tokyo, Japan Application December 29, 1938, Serial No. 248,351

6 Claims. (Cl. 19—3)

This invention relates to a cocoon thread reeling pan for multispool reeling.

The invention has for its object to provide an improved reeling pan primarily designed to enhance the convenience and improve the efficiency of reeling operations.

The annexed drawings show one example of the construction of the reeling pan according to this invention.

Fig. 1 is a plan of the reeling pan according to this invention.

Fig. 2 shows its elevation.

Fig. 6 is a sectional side elevation on line 6—6 in Fig. 1.

Fig. 7 is a sectional side elevation on line 7—7 in Fig. 1.

Fig. 8 is a sectional side elevation on line 8—8 in Fig. 1.

Fig. 9 is an elevation of a cocoon basket which is an accessory of the reeling pan.

Fig. 10 shows a plan of the said basket.

Figure 3:
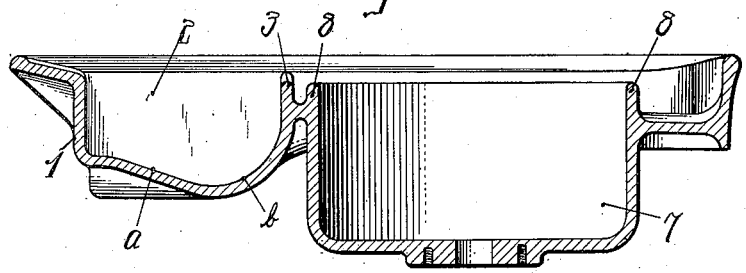
Fig. 3 is a sectional side elevation on line 3—3 in Fig. 1.
Figure 4:
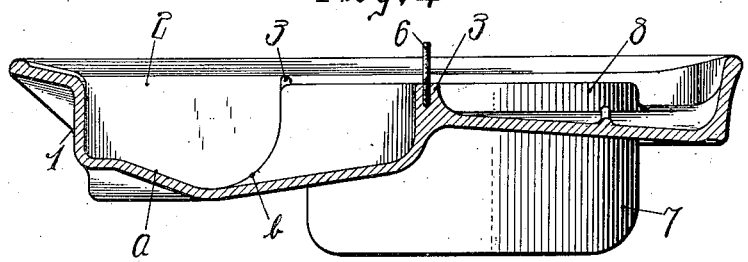
Fig. 4 is a sectional side elevation on line 4—4 in Fig. 1.
Figure 5:
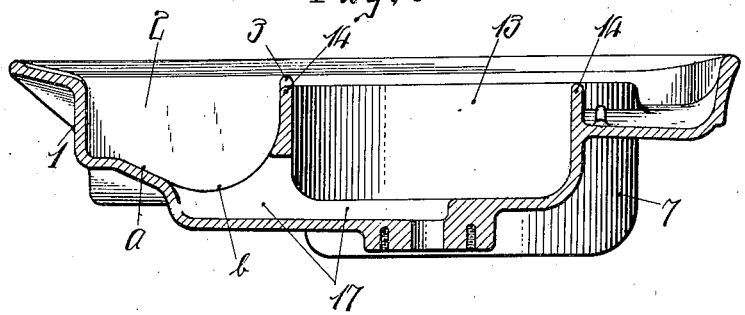
Fig. 5 is a sectional side elevation on line 5—5 in Fig. 1.

As will be seen from the drawings; in the rear portion of the reeling pan 1, a water tank 2 for reeling purposes, is provided; the tank bottom slopes down from both sides towards the middle as shown at $a$ and $b$ in Figs. 3 to 8. The partition walls 3 of the tank, form adjusted cocoon storage portions 4 and 5 with curved walls and in the walls 3 of the curved portions 4 and 5, several projections 6 are provided for hanging fibres.

On the right hand side of the curved portion 4, a hollow pot 7 is formed, for use of fibre end catching and in the interior of the pot, a suitable heating arrangement such as steam injection pipe is provided.

The boundary wall of the pot 7 is slightly projected up all around as at 8; and to the projections 8, bent strips 10 of a cocoon basket 9 are adapted to hang.

As shown in Figs. 9 and 10 the cocoon basket 9 is fitted with handle pieces 11 and at suitable points of the bottom and side walls, several holes 12 are bored.

On the left hand side of curved portion 4, a fibre adjusting hollow pot 13 is formed and the top portion of the wall 14 of the pot 13, is made so as to be able to suspend cocoon basket 11.

The bottom of fibre adjusting pot 13 is connected to the bottom of the fibre catching pot 7 by means of connection pipes 15; and in the middle portion of the pipes, a water tank 16 is provided, so as to be able to automatically regulate the water levels of fibre adjusting and fibre catching pots. The bottom of the hollow pot 13 is also connected to the bottom of the water tank 2 by means of conduit 17.

On the right hand side of the curved portion 5, a basin 18 for dropped cocoons, is provided and at the bottom of the basin 18, a drainage hole 19 is bored.

On the left hand side of the curved portion 5, a storage basin 20 for boiled cocoons is provided and at the bottom of the basin, a drainage hole 21 is bored.

As shown in Fig. 1 and Fig. 2, the basin for boiled cocoons 20 and the basin for dropped cocoons are formed in one body, being surrounded by a wall 22.

From boiled cocoon basin 20, the bottom surface gradually slopes up towards the dropped cocoon storage, as shown at 23, thus making it convenient for picking up boiled cocoons and for general reeling operation.

On one side of the boiled cocoon basin 20, an inferior cocoon storage basin 24, a wastes storage basin 25 and a chrysalis storage 26 are provided, side by side and in the bottom portions of these storage basins, drainage holes 27 are bored.

To explain the operation: Boiled cocoons are first taken to the storage basin 20 by using cocoon catchers; then utilizing the inclined plane 23 of the boiled cocoon storage, a suitable number of adjusted cocoons, is retained at projections 6.

The cocoons retained at the hollow curved portions 4 and 5 by the projections 6, are fed to the cocoon fibre feeding apparatus as much as necessary. Cocoons not adjusted at the boiled cocoon storage, are brought to the cocoon basket 9 suspended in the fibre catching portion 7 and then boiled.

Cocoons properly boiled there, are brought in the basket to the fibre adjusting pot 13.

Then cocoons arranged or adjusted there are suspended from the projections 6.

Cocoons retained in the hollow portions 4 and 5 of water tank 2, are kept at the same temperature as the cocoons which are being reeled and gradually fed.

Cocoons, drop fibred in the water basin 2 and chrysalis gradually slip down to the lowest portion of inclined faces $a$ and $b$.

Chrysalises are taken to the chrysalis storage basin 26 and dropped cocoons are taken to their storage basins 18. When they have fairly collected, they are taken over to the fibre catching pot 7 and used for operation.

These dropped cocoons placed in tank 2 which have fibre ends, are directly taken to the fibre feeding apparatus and used for reeling operation.

The present invention has the construction as explained above and it is evident that it is convenient to take up dropped cocoons and chrysalis.

Again cocoons to be fed to the fibre feeding apparatus, are kept in water of proper and constant temperature and therefore the quality of threads produced can be maintained uniformly. Cocoons, drop fibred or not fibred are boiled in fibre catching pot 7 and therefore it is convenient for catching fibre ends; moreover as they properly cool in fibre adjusting pot, they are prevented from being excessively expanded, thus making the fibre separation easy.

The catching pot and the fibre adjusting pot are connected together by the connection pipes 15 fitted with water tank 16 at their middle portion, so that the water levels of these pots are kept uniform and constant, regardless of existence of cocoon basket; both hot and cold water do not flood over; and it is not necessary to supply water.

Therefore density of hot water in the fibre catching pot, is kept uniform and by the provision of water tank, hot water in the catching pot and cold water in the adjusting pot, will not mix. Again the bottom portions of the fibre adjusting pot and the water tank, are connected together and the temperatures of water can be kept about the same; and by the water supply from water pipe provided in the upper portion of reeling tank, the water levels of the thread reeling water tank, the fibre adjusting portion and the fibre end catching portion may be kept constant and prevented from being flooded.

Thus, according to the invention in the reeling operation, it is convenient and the efficiency is increased and therefore superior products may be obtained.

Having thus described my invention, what I claim as new, and desire to secure by Letters Patent of the United States of America is:

1. A reeling pan for multispool reeling machines comprising a rectangular pan, a water tank for thread reeling at one side of said pan and fibre end catching and fibre adjusting pots together with dropped cocoon storage, boiled cocoon storage and waste storage basins at the opposite side of said pan, and a partition located in said pan and projections on said partition for hanging fibres thereon.

2. A reeling pan for multispool reeling machines comprising a rectangular pan, a water tank for thread reeling at one side of said pan and fibre end catching and fibre adjusting pots together with dropped cocoon storage, boiled cocoon storage and waste storage basins at the opposite side of said pan, and a heating device arranged in the fibre end catching pot, the edges of the last mentioned pot projecting upwardly above the bottom of said pan.

3. A reeling pan for multispool reeling machines comprising a rectangular pan, a water tank for thread reeling at one side of said pan and fibre end catching and fibre adjusting pots together with dropped cocoon storage, boiled cocoon storage and waste storage basins at the opposite side of said pan, and a heating device arranged in the fibre end catching pot, the edges of the last mentioned pot projecting upwardly above the bottom of said pan, a perforated cocoon basket and means on said basket for supporting the latter on the projecting edge of said fibre end catching pot.

4. A reeling pan for multispool reeling machines comprising a rectangular pan, a water tank for thread reeling at one side of said pan and fibre end catching and fibre adjusting pots together with dropped cocoon storage, boiled cocoon storage and waste storage basins at the opposite side of said pan, and a pipe connecting the bottoms of the fibre adjusting and fibre catching pots, and a water tank communicating with the medial portion of said connecting pipe.

5. A reeling pan for multispool reeling machines comprising a rectangular pan, a water tank for thread reeling at one side of said pan and fibre end catching and fibre adjusting pots together with dropped cocoon storage, boiled cocoon storage and waste storage basins at the opposite side of said pan, and a pipe connecting the bottom of the water tank with the bottom of the fibre adjusting pot.

6. A reeling pan for multispool reeling machines comprising a rectangular pan, a water tank for thread reeling at one side of said pan and fibre end catching and fibre adjusting pots together with dropped cocoon storage, boiled cocoon storage and waste storage basins at the opposite side of said pan, and an inclined member interposed between the boiled cocoon storage and the dropped cocoon storage basins.

SABURO MINORIKAWA.